(12) United States Patent
Bassein

(10) Patent No.: US 10,220,870 B2
(45) Date of Patent: Mar. 5, 2019

(54) HYBRID SNOW VEHICLE CONVERSION KIT

(71) Applicant: Matthew Brian Bassein, Los Angeles, CA (US)

(72) Inventor: Matthew Brian Bassein, Los Angeles, CA (US)

( * ) Notice: Subject to any disclaimer, the term of this patent is extended or adjusted under 35 U.S.C. 154(b) by 0 days.

(21) Appl. No.: 14/900,967

(22) PCT Filed: Nov. 7, 2014

(86) PCT No.: PCT/US2014/000207
§ 371 (c)(1),
(2) Date: Dec. 22, 2015

(65) Prior Publication Data
US 2017/0291630 A1    Oct. 12, 2017

(51) Int. Cl.
| | | |
|---|---|---|
| B62B 17/00 | (2006.01) | |
| B62B 13/08 | (2006.01) | |
| B62B 13/00 | (2006.01) | |
| B62K 13/08 | (2006.01) | |
| B62B 13/18 | (2006.01) | |
| B62M 27/02 | (2006.01) | |

(52) U.S. Cl.
CPC .............. *B62B 17/00* (2013.01); *B62B 13/00* (2013.01); *B62K 13/08* (2013.01); *B62B 13/18* (2013.01); *B62B 2206/006* (2013.01); *B62M 2027/022* (2013.01)

(58) Field of Classification Search
CPC ......... B62B 13/00; B62B 13/02; B62B 13/04; B62B 13/06; B62B 13/08; B62B 13/10; B62B 13/12; B62B 13/14; B62B 13/18; B62B 15/00; B62B 17/08; B62B 19/04

USPC .......... 280/845, 12.1, 15, 16, 17, 21.1, 22.1, 280/28.14, 28.16
See application file for complete search history.

(56) References Cited

U.S. PATENT DOCUMENTS

| | | | | |
|---|---|---|---|---|
| 3,297,335 A | * | 1/1967 | Ogata ..................... | B62B 13/10 280/16 |
| 3,398,970 A | * | 8/1968 | Horiuchi ................. | B62B 13/12 280/16 |
| 3,799,565 A | * | 3/1974 | Burtis ..................... | B62B 13/12 180/182 |
| 3,870,330 A | * | 3/1975 | Hatano ................... | B62B 13/04 280/16 |
| 4,027,891 A | * | 6/1977 | Frame ..................... | B62B 13/04 280/16 |

(Continued)

*Primary Examiner* — Frank B Vanaman
(74) *Attorney, Agent, or Firm* — Mu P.C.

(57) ABSTRACT

A conversion kit for a snow vehicle has a front assembly component, the front assembly component has a front ski, a bracket that is attached to the front ski, two extension arms that are pivotally attached to the bracket extending upwardly from the front ski, and a rear assembly component having a two or more adjacent members, a mount attached to the pivot unit, comprising a clamping attachment on one end configured to retain a section of the frame on another end, a ski attachment terminating each adjacent member, a pivot unit, comprising at two horizontal pivot bars pivotally connecting the adjacent members at its ends, and pivotally connected to the mount at a midpoint, wherein the one or more horizontal pivot bars move the adjacent members interdependently, and wherein each member extends from a common pivot unit and terminates at a ski attachment.

7 Claims, 12 Drawing Sheets

(56) References Cited

U.S. PATENT DOCUMENTS

| | | | | |
|---|---|---|---|---|
| 4,219,207 A | * | 8/1980 | Muir | B62B 13/12 |
| | | | | 188/8 |
| 4,324,409 A | * | 4/1982 | Larsen | A63C 11/002 |
| | | | | 280/14.1 |
| 2001/0038184 A1 | * | 11/2001 | Stafford | B62B 13/04 |
| | | | | 280/14.27 |
| 2007/0096410 A1 | * | 5/2007 | Spencer | B62B 13/12 |
| | | | | 280/14.21 |
| 2007/0257452 A1 | * | 11/2007 | Stene-Johansen | B62B 13/12 |
| | | | | 280/16 |

* cited by examiner

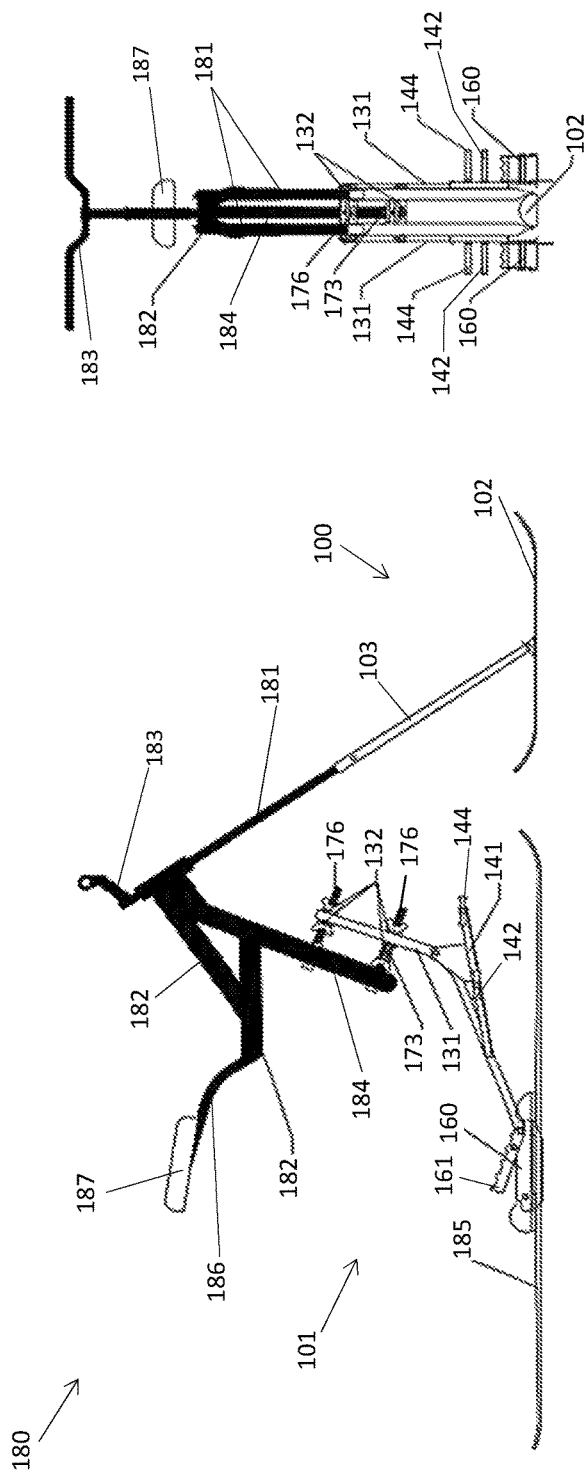
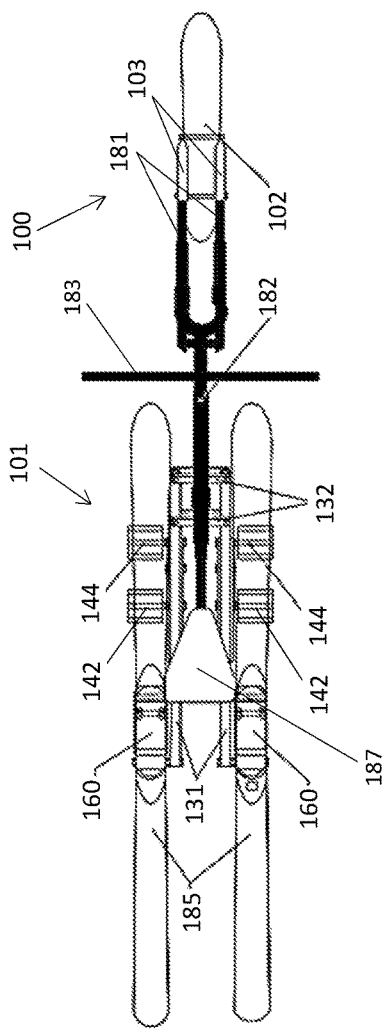
FIG. 8a
FIG. 8b
FIG. 8c

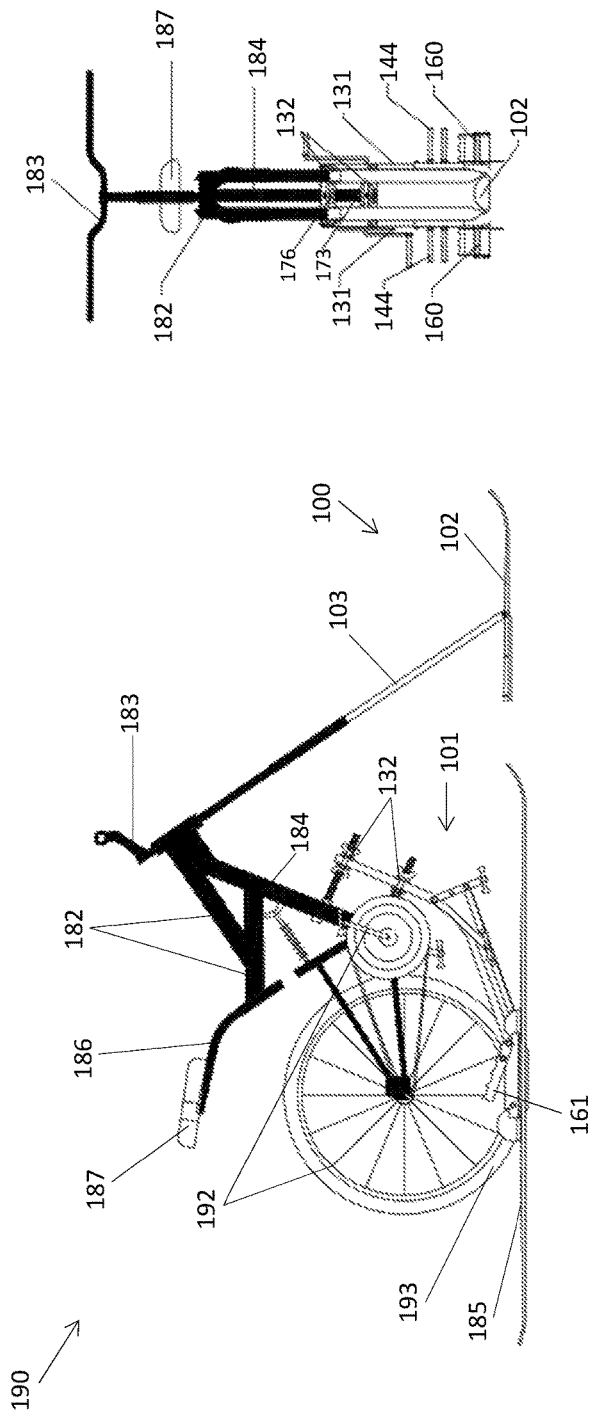
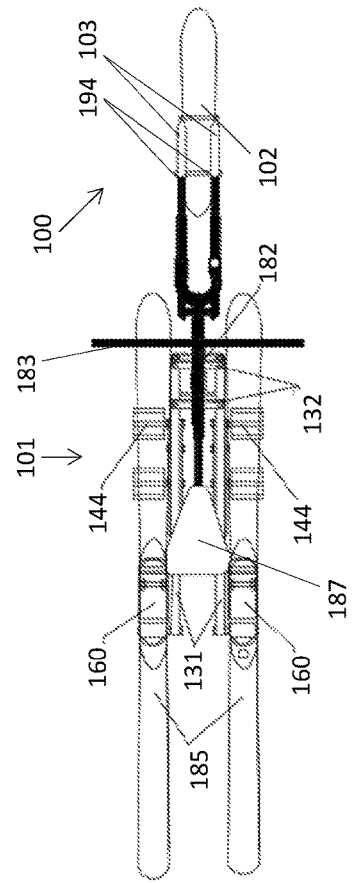
FIG. 9b
FIG. 9a
FIG. 9c

HYBRID SNOW VEHICLE CONVERSION KIT

CROSS-REFERENCE TO RELATED APPLICATION

The present application is a National Stage Application under 35 U.S.C. § 371 of International PCT Application No. PCT/US2014/000207 filed on Nov. 7, 2014, the entire disclosure of which is incorporated by reference herein.

BACKGROUND OF THE INVENTION

1. Field of Invention

The present invention relates to the field of snow vehicles. More particularly skiing vehicles designed for sporting or recreational purposes. The invention further relates to cycling and the ability to convert cycling vehicles into a vehicle suitable for use in snowy terrain.

2. Description of Related Art

Skiing typically entails a person wearing specific ski boots that attach to skis to enable a person to glide along the snow, using spokes to push or guide along the path. Cycling typically entails a person sitting on a seat and riding along on wheels usually on harder surfaces. The combination of skiing and cycling, or the adapting of a cycling vehicle into one that can be used on the snow, creates a hybrid activity and vehicle. This adapted vehicle allows a person to ride in a snowy terrain for recreation or sport. The hybrid snow vehicle is helpful for those less able to use traditional skiing equipment for example, disabled people. The spreading out of forces works to create a reduced impact on the knees and other joints thus making the ride more enjoyable for people with physical concerns. It also enables novice or children riders to learn and enjoy the snow when skiing or snowboarding since often these activities are found to be challenging at first.

There exists in the art the idea of converting a bicycle-type frame to a have skis such that a person is able to ride on the snow, in a similar form to that of a bicycle. The term skibobbing is known in the art to mean a winter sport that involves attaching a bicycle frame to skis instead of the wheels and a set of foot skis. When foot skis are used this defines skibobbing. This is distinct to ski bikes or snow bikes which involves cycling on snow. There does not seem to be a defined field where ski bobbing and snow biking are combined such that a wheel is incorporated into the vehicle. Snow vehicles of this hybrid type are able to reach very high speeds and are used for racing and recreational purposes, including downhill riding where all attachments can be skis, and cross-country riding where the back wheel and pedals, of the bicycle for example, remain on the hybrid adaption.

Currently, different types of snow vehicles exist in the field that enables a bicycle to be converted to a skiing vehicle. These vehicles have a front ski that can be steered and either one or two rear skis. The majority of these vehicles have one ski at the front and one ski at the back. This two-ski arrangement, which is like a direct conversion from a bicycle to a ski vehicle, lacks the stability provided by three skis models. In a three-ski model, a frame is adapted to have one ski in the front and two skis in the rear instead of only one ski in the rear. The problem with the three ski models currently is that the rear skis are not easily interchangeable, or have brakes which makes riding more difficult. There also exist in the art, cross-country snow vehicles that have a track for the rear wheel and are similarly designed to the three ski snow bicycles.

The snow vehicles are commonly constructed using an existing bicycle frame, where the front and rear wheels are replaced with skis. All are in a bicycle-style with 2 skis. This conversion from bicycle to snow vehicle is completed prior to taking a snow vehicle onto the snow.

There are 3 ski snow bikes or sleds that are made with a stiff or immovable rear axle. This inflexibility makes turning the vehicle difficult and in turn affects the ease of use and enjoyability of the rider when moving along on the snow.

Other inventions use springs attached in the rear to improve balance and to further provide a small range in flexibility in the ability of the rear skis to move up and down. Some snow vehicles incorporate a trapezoidal mechanism that allow for the rear skis to move individually up and down to allow for more efficient turning. Other inventions have incorporated 2 horizontal pivot bars to allow the skis to move up and down. However such inventions lack rear spring suspension. Such inventions also lack a wide range of adjustment options for the rear skis and have limited adjustment for seat height.

Inventions in the field often comprise rigid rear ski attachments that cause problems when moving along a varying surface. The rigidity prevents such skis from maintaining optimum contact with the surface of the snow when riding along. The reduced contact produces instability and more frequent accident and fall over incidences. It also discourages the rider from riding faster due to the feeling of instability.

Based on the foregoing, there is a need in the art for a more stable ski vehicle with a front ski that makes turning more efficient. There is a further need to be able to easily convert a bicycle or other cycling equipment into a ski vehicle without large amounts of effort. Also there remains a need for ski vehicles being suitable for racing and also cross country skiing that are stable and reliable.

SUMMARY OF THE INVENTION

A conversion kit for a snow vehicle has a front assembly component, the front assembly component has a front ski, a bracket that is attached to the front ski, two extension arms that are pivotally attached to the bracket extending upwardly from the front ski, and a rear assembly component having a two or more adjacent members, a mount attached to the pivot unit, comprising a clamping attachment on one end configured to retain a section of the frame on another end, a ski attachment terminating each adjacent member, a pivot unit, comprising of two horizontal pivot bars pivotally connecting the adjacent members at its ends, and pivotally connected to the mount at a midpoint, wherein the two horizontal pivot bars move the adjacent members interdependently, and wherein each member extends from a common pivot unit and terminates at a ski attachment.

In an embodiment, the pivot unit comprising two pivot bars. The rear ski has a snap in attachment mechanism that is configured to receive most skis. The frame may be a bicycle frame with dual suspension.

In an embodiment, the rear assembly component further has at least one braking unit that is operated using a foot brake pedal. The braking unit may be pivotally connected to the adjacent member, and further comprises a brake bar in communication with the pedal, and that is configured to extend downwardly when pressure is applied to the pedal.

The ski attachments may have upwardly disposed levers adapted to lift the front ski when they are depressed. The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 8a is a right side view of the conversion kit in use as a downhill hybrid snow vehicle, according to an embodiment of the present invention;

FIG. 8b is a front view of the conversion kit in use as a downhill hybrid snow vehicle, according to an embodiment of the present invention;

FIG. 8c is a plan view of the conversion kit in use as a downhill hybrid snow vehicle, according to an embodiment of the present invention;

FIG. 9a is a right side view of the conversion kit in use as a cross country hybrid snow vehicle, according to an embodiment of the present invention;

FIG. 9b is a front elevation view of the conversion kit in use as a cross country hybrid snow vehicle, according to an embodiment of the present invention;

FIG. 9c is a plan view of the conversion kit in use as a cross country hybrid snow vehicle, according to an embodiment of the present invention;

DETAILED DESCRIPTION OF THE INVENTION

Definitions

Figure 1A:
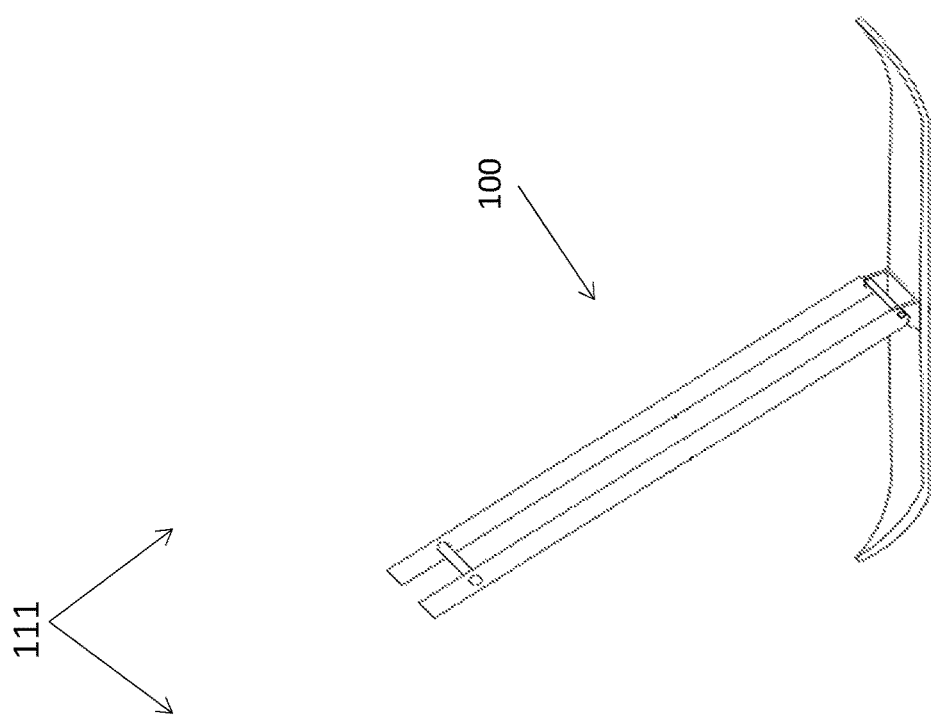
FIG. 1a is a right side elevation view of the front assembly component (FAC) of the conversion kit, according to an embodiment of the present invention.

The terms "snow vehicle", "snow bike", "hybrid vehicle", "hybrid snow vehicle", "hybrid ski vehicle" and "hybrid bike" are used synonymously and intended to describe a general class of sports and recreational vehicles with which the present invention can be used. The general class of vehicles comprises vehicles that can combine various forms of snow vehicles or equipment and pre-existing or custom built frames, to enable a user to ride in a snowy or similar environment.

The terms "ski biking", "snow biking", "ski bobbing" are intended to describe the activity of riding the hybrid snow vehicle. The terms are used interchangeably and do not limit the activity to a particular type of vehicle.

The terms "cycling vehicle", "bicycle" and "bike" are used interchangeably and can be replaced by either term. The terms are further intended to comprise other configurations of cycling vehicles, for example but not limited to tricycles and multiple additions or variation thereof.

The term "desired activity" or "desired use" means any scenario where the conversion kit can be used including but not limited to sporting and recreational events. The activity may encompass racing, cross country riding, easy riding and all variations possible on a snowy or equivalent environment where a hybrid vehicle can be used, for example but not limited to sand dunes and grass.

Preferred embodiments of the present invention and their advantages may be understood by referring to FIGS. 1a-12, wherein like reference numerals refer to like elements.

Figure 1B:
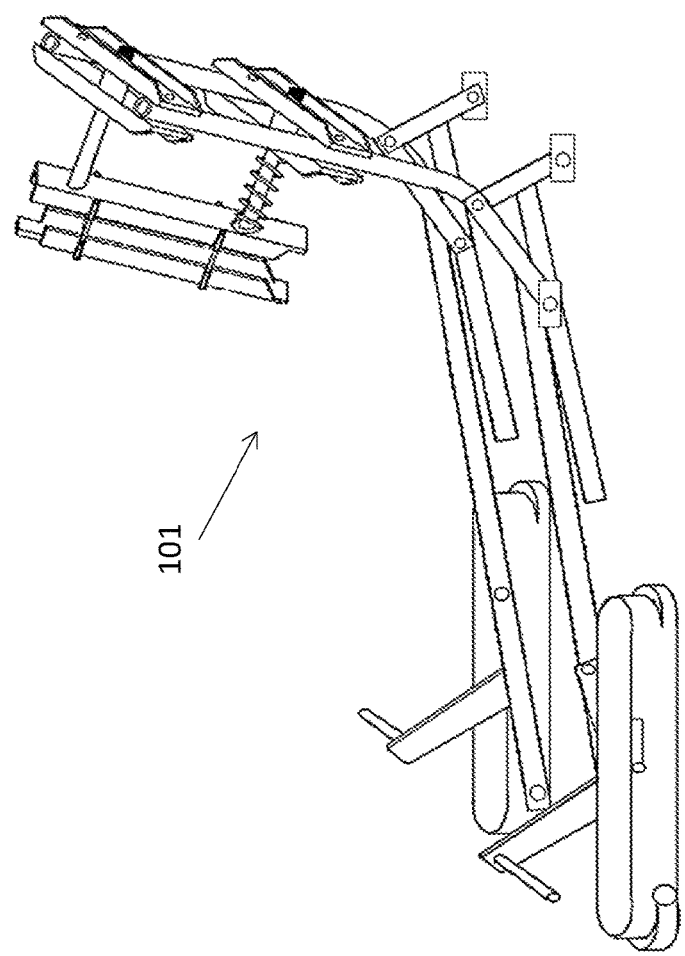
FIG. 1b is a right side elevation view of the rear assembly component (RAC) of the conversion kit, according to an embodiment of the present invention.

In an embodiment, FIGS. 1a and 1b illustrate the present invention that is a conversion kit (111). In an embodiment, the conversion kit (111) allows a user to transform a frame, for example the frame of a bicycle (182) (shown in FIGS. 8a-9c), into a hybrid snow vehicle, by using the assembly components (100 and 101) of the conversion kit (111). In an embodiment, the conversion kit (111) is adapted to be used on different frames, wherein it would be obvious to one skilled in the art to make adjustments to suit variations in frame structures.

In an embodiment of the invention, FIGS. 1a and 1b illustrate the assembly components that make up the conversion kit (111). FIG. 1a shows the front assembly component (FAC) (100) of the conversion kit that is attached to the front of a frame (182) (shown in FIGS. 8a-9c) during the conversion process and FIG. 1b shows the rear assembly component (RAC) of the conversion kit that is attached to the rear of the frame (182) during the conversion process. In particular embodiments, the FAC and RAC are modified to accommodate specific activities. In other embodiments, the FAC and RAC are attached in combination or separately based on the desired activity.

Figure 2:
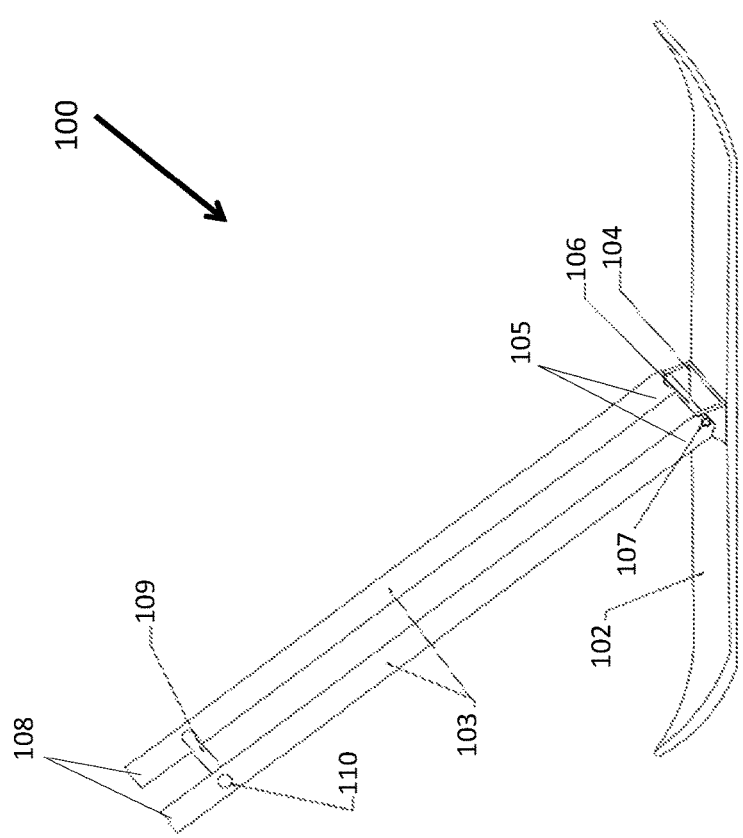
FIG. 2 is a right side elevation view of the front assembly component of the conversion kit, according to an embodiment of the present invention.

In a preferred embodiment, FIG. 2 shows a detailed view of the FAC (100). The FAC (100) has a front ski (102) and extension arms (103). The front ski (102) is attached to the extension arms (103) using a bracket (104), coupler (106) and bolts (107). The front ski (102) sits flat on the ground and the bracket (104) is fixed to the upper surface of the front ski (104). In an embodiment, the fixing location can be anywhere along the length of the front ski depending on the desired use of the transformed vehicle (180, 190, 200, 210, 220). The bracket (104), coupler (106) and bolts (107) are used to pivotally attach the lower ends (105) of the extension arms (103) to the upper surface of the front ski (102). The extension arms (103) are secured at a second point at the free end using a coupler (109) and bolts (110) for further structural stability. The upper ends (108) of the extension arms (103) are free-ended such that the free ends are available to be attached to a frame (182) (shown in FIGS. 8a-9c).

Figure 3:
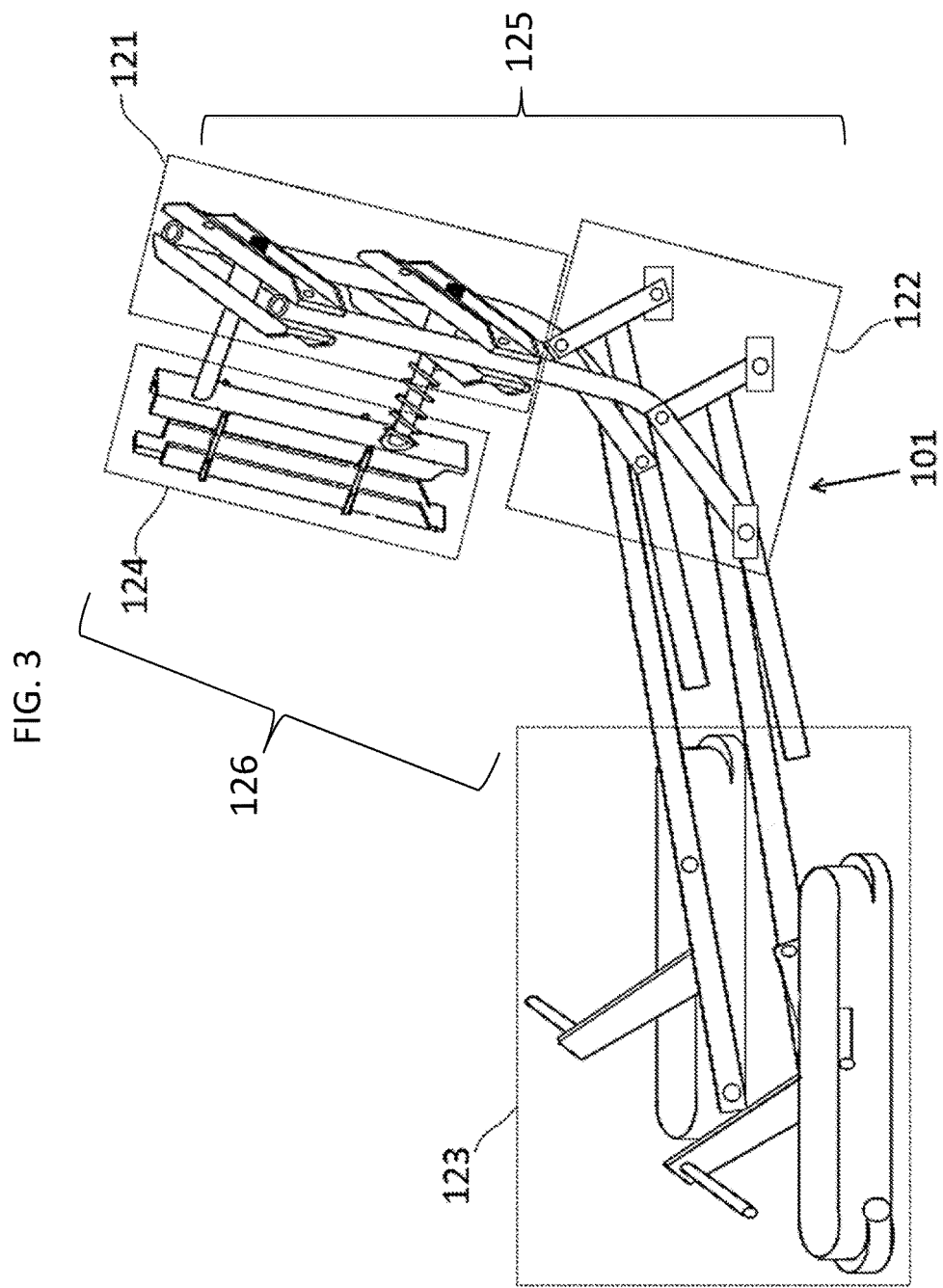
FIG. 3 is a right side elevation view of the rear assembly component of the conversion kit, according to an embodiment of the present invention.

With reference to FIGS. 2 and 3, in a preferred embodiment the front ski (102) is shorter in length than the rear skis (185). The front ski (102) can be another type of attachment, for example but not limited to a kid or children's ski, snow blade or customized ski. The shorter length of the front ski (102) allows for easier and more efficient steering when the hybrid vehicle is in use. In an embodiment, the extension arms (103) are 1" EMT pipes, the bracket (104) is made from aluminum, the coupler (106) is ³⁄₁₆" and the bolts (107) are ⅜". In an embodiment of the invention, the width of the couplers (106, 109) and bracket (104) is altered to accommodate a particular sized front ski (102) or other attachment. The width of the couplers (106, 109) and bracket (104) can be narrower, wider, longer, shorter and any variation thereof depending on the desired attachment mechanism, activity or type of front attachment (102). The extension arms (103) can be altered in length and thickness to accommodate the appropriate structural integrity required for a particular FAC based on the desired activity.

In an embodiment of the invention, FIGS. 3 and 8 illustrate the RAC (101) of the conversion kit (111). In a preferred embodiment, the RAC (101) comprises rear ski support pipes (131) and four interconnected units, namely the pivot unit (121), the foot-braking unit (122), the rear ski attachment unit (123), and the mount unit (124). Each of the four units (121, 122, 123, 124) is directly or operably connected to the rear ski support pipes (131) to form the RAC (101). The RAC (101) has an inner side (125) that faces towards the FAC (100) when in use with a frame (182) and an outer side (126) that faces the rider when in use with a frame (182). In a preferred embodiment, the pivot unit (121), the foot-braking unit (122) and the rear ski attachment unit (123) are directly attached to the rear ski support pipes (131). In a preferred embodiment, the mount unit (124) is the attachment mechanism that connects the RAC (101) to the frame (182).

Figure 4:
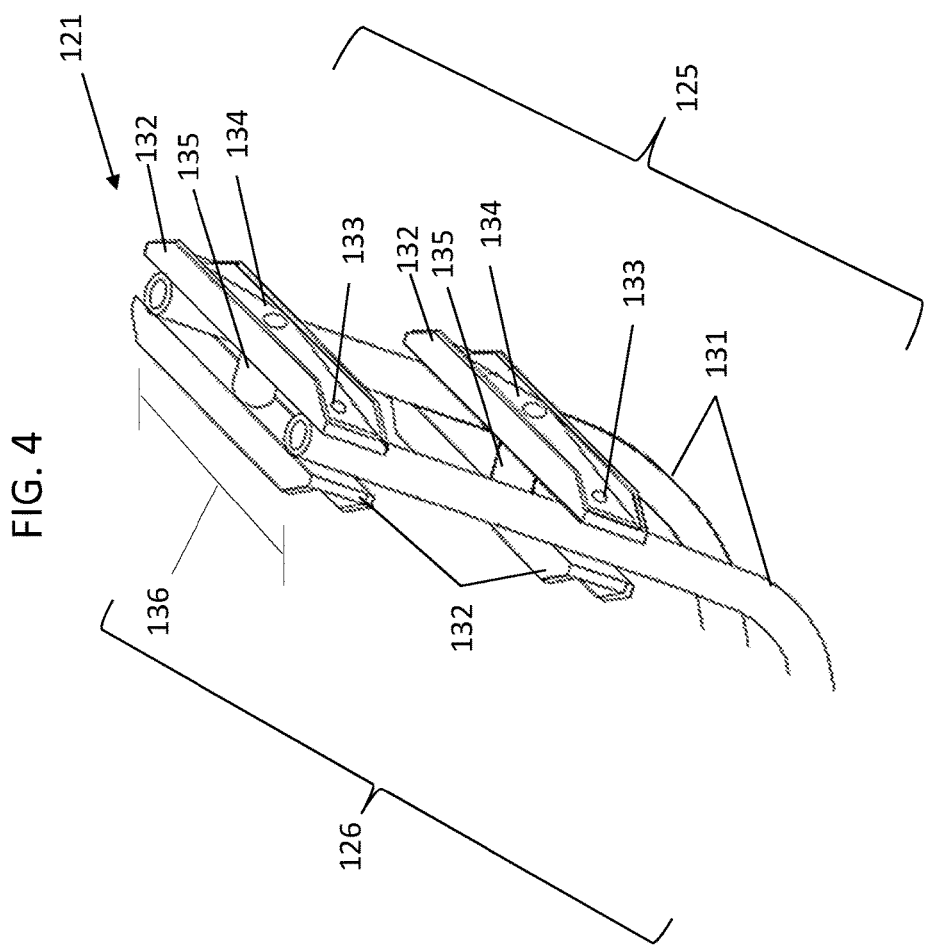
FIG. 4 is a detail view of the pivot unit of the rear assembly component, according to an embodiment of the present invention.

In an embodiment of the invention, FIG. 4 is a detailed side elevation view of the pivot unit (121). In a preferred embodiment, two opposing C Channels (132) are pin attached (133) to the inside face (125) of the support pipes (131) and two C Channels (132) are pin attached (133) to the outside face (126) of the support pipes (131). In an embodiment, two support pipes (131) are secured in parallel to each other using opposingly faced C channels (132) and pins (133). In an embodiment, the inside facing (125) and outside facing (126) C Channels (132) are secured together using crossbeams (135) to connect the opposingly located C Channels (132) in the center. The ends of the opposingly located C Channels (132) are pin connected (133) to the support pipes (131) to form a frame like structure that is the pivot unit (121). In an embodiment, stabilizing straps (134) run through the inside of the C Channels (132) to provide a further source of support to for support pipes (131) and to reduce the wobbling effect of the support pipes when riding. In other embodiments, it would be obvious to one skilled in the art to secure the C Channels (132) using other suitable mechanisms well known in the art.

In a preferred embodiment, the support bars (131) are ¾" pipes, the pins (133) are ⁵⁄₁₆" with nuts, the four C Channels (132) are ¾"×1½" each, the stabilizing strap (134) is ⅛"×1" and the crossbeams (135) used are ¾"×2½". In a preferred embodiment, the C Channels (132) are shortened to create a narrower width (136) in the pivot unit (121) by bringing the support bars (131) closer together so as to create less interference with the rider during motion and to allow for a particular type of riding experience. In another embodiment, the C Channels (132) are lengthened to create a longer width (136) in the pivot unit (121) by spreading the support pipes (131) out further from each other to create a particular riding experience. In an embodiment, it would be obvious to one skilled in the art to change or adapt the size, shape and type of attaching bits of the pivot unit (121) in order to achieve the appropriate or desired support for a particular use of the component. FIG. 4 shows two sets of two C Channels that create and upper and lower pivot bars. In other embodiments, the multiple pivot units in themselves can have varying C Channels to suit the particular frame and desired activity.

In a preferred embodiment, the crossbeams (135) in the pivot unit (121) are free to receive the connection bolts (176) of the mount unit (124) so that they slide over the connection bolts (176) like a sleeve and are secured so that they are free to rotate. The pin attachments (133) and crossbeams (135) allow rotational movement so that the secured support pipes (131) are attached to the pivot unit while still being able to pivot about the connection bolts (176) (shown in FIGS. 7, 8a, 8b, and 9b) in the mount unit (124). The pivot unit (121) is able to pivot about the pin attachments (133) to the support pipes (131) and central nipples that allow the hybrid vehicle to lean or tilt from side to side when it is in use. In a preferred embodiment, the configuration of the C Channels (132) create an interdependent movement of the support pipes (131) such that when one pipe is pushed upwards the other moves downwards due to the C Channel (132) being a common connection point.

Figure 5:
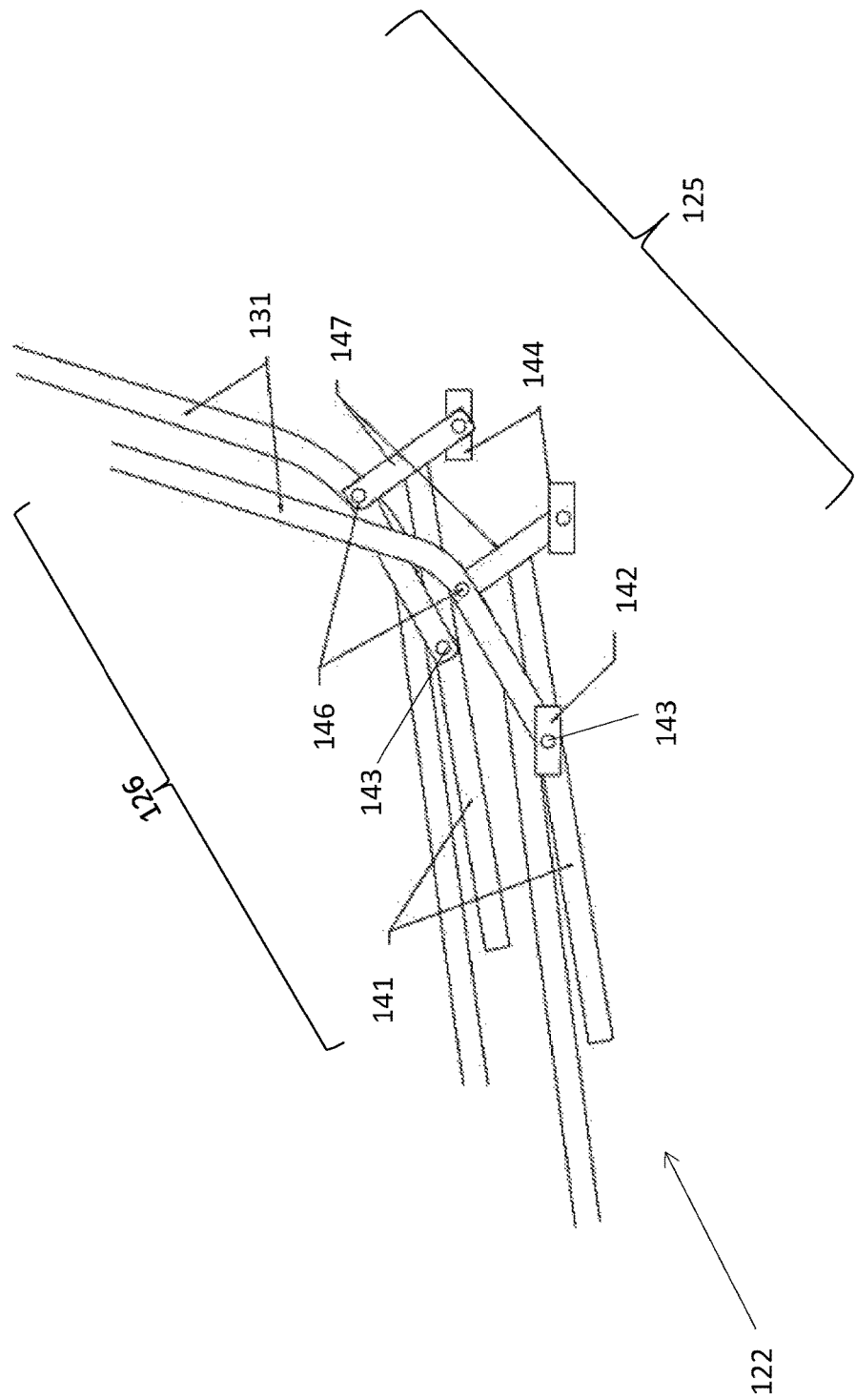
FIG. 5 is a detail view of the foot brake unit of the rear assembly component, according to an embodiment of the present invention.

In an embodiment of the invention, FIG. 5 illustrates the braking unit (122) of the RAC (101). The braking unit (122) is attached to the support pipes (131) using straps (147) that are attached to the foot-brake pedals (142), footrest pedal (144) and resilient channel or brake bar (141). The straps (147) are connected to the support pipes (131) using bolts (146). In a preferred embodiment, the foot braking unit (122) is attached to the inside facing surface (125) of the support pipes (131) so as to create minimum interference with the person riding the vehicle however the location of the foot brake unit (122) can be changed based on a rider's preference. The braking unit (122) operates when a user presses the foot-brake pedals, pushing the brake bar (141) down and causing it to dig into the snow to create resistance and slowing down the vehicle. This action is increased when the rider puts more pressure onto the foot brake pedal (142).

In a particular embodiment of the conversion kit (111), the braking unit (122) forms part of the RAC (101) by attaching it to ¾" support pipes (131) using ⁵⁄₁₆" bolts with nuts (146). The foot-brake pedal (142) and the footrest pedals (144) are attached to the support pipes (131) brake bar with a ½" bolt (143) are secured to support pipes with ⅞" straps (144).

Figure 6:
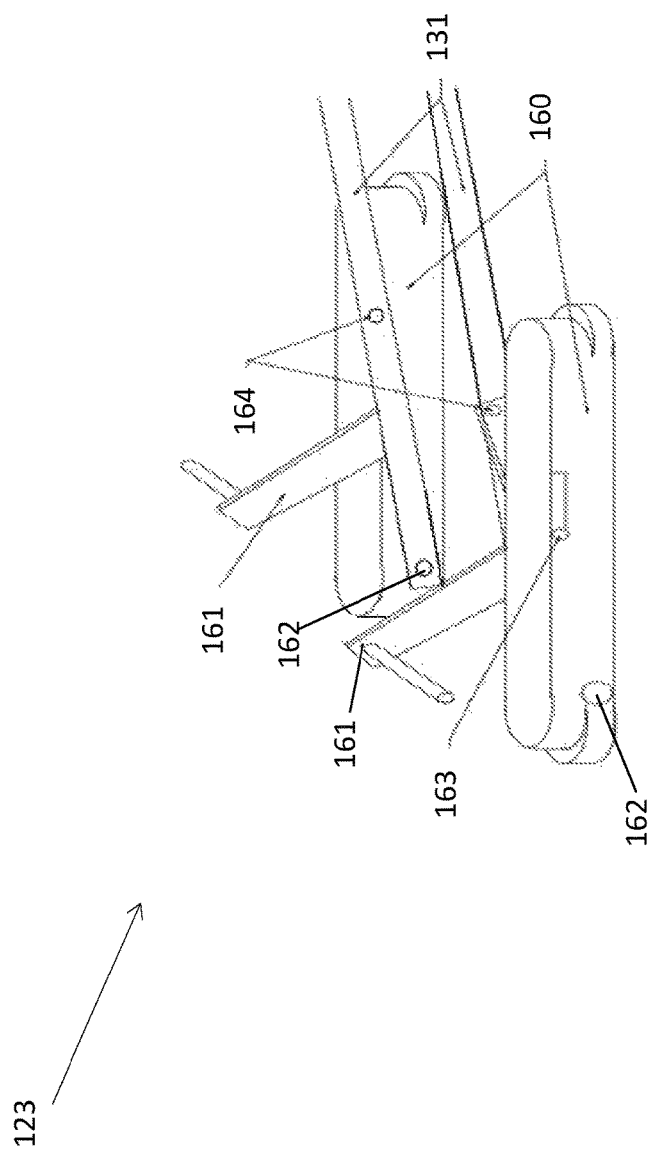
FIG. 6 is a detail view of the rear ski attachment unit of the rear assembly component, according to an embodiment of the present invention.

In an embodiment of the invention, FIG. 6 illustrates the ski attachment unit (123) of the RAC (101). The ski attachment unit (123) has molds (160) that are shaped in a particular form such that they are able to snap into a standard ski binding. The molds (160) attach to a ski similar to ski boots. In a preferred embodiment the molds (160) are connected to the support pipes (131) using ½" bolts (162). Each ski attachment (123) is pivotally attached to a support pipe (131), and has a vertically-disposed lever (161) that acts to lift the entire snow bike frame with the front ski, when the rider leans back or steps on the lever, enabling rider to slide on rear skis only similar to achieving a wheelie on a bicycle. In a preferred embodiment, the levers (161) are connected to the support pipes using ½" bolts and to the molds with ⁵⁄₁₆" bolts (164).

Figure 7:
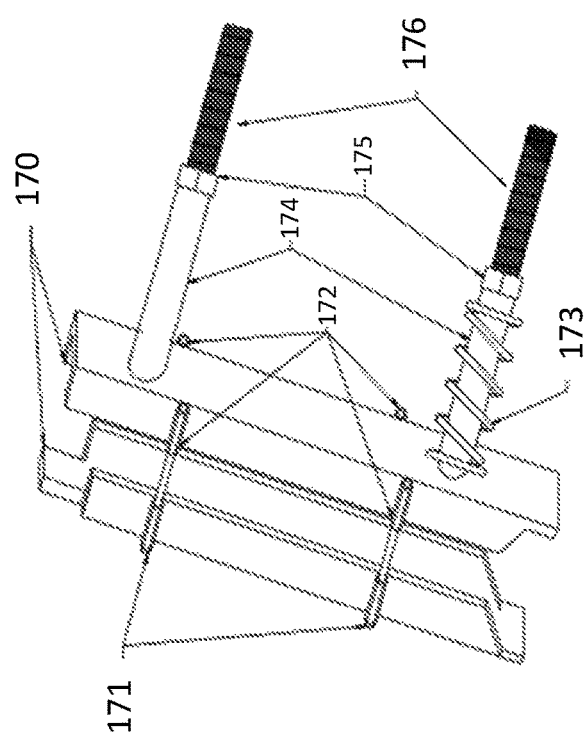
FIG. 7 is a detail view of the frame connection unit of the rear assembly component, according to an embodiment of the present invention.

In an embodiment of the invention, FIG. 7 illustrates the mount unit (124) that connects the entire RAC (101) to the frame (182) at one end and pivotally bolts (176) into the pivot unit (121) at another end. At the end where the mount unit (124) attaches to the frame (182) (shown in FIGS. 8a-9c), there are two C-Channels (170) where the openings of each C shape faces into each other to create clamp like mechanism. The C Channels (170) are connected using bolts (171) that are tightened into sleeves (172) to enable the C-channels to clamp securely to a frame (182). At the other end, the mount unit (124) has two connection bolts (176) protruding from one of the C Channels (170). The two connection bolts (176) fit into sleeves (174) and slide into the crossbeams (135) of the pivot unit (121) are secured using wing nuts. In an embodiment, a spring (173) slides over the lower connection bolt and provides resistance in movement of the mount unit relative the pivot unit, in effect rear suspension for the snow bike.

In an embodiment of the invention, FIGS. 8a, 8b and 8c illustrate the conversion kit in use with a frame (182) to transform a bicycle into a downhill hybrid snow vehicle (180). In a preferred embodiment, the bicycle used to create the frame (182) has dual suspension, wherein removing the front wheel, rear wheel and pedals of the bicycle, in order to create open attachment points, creates the frame, to which the conversion kit (111) is attached. The FAC (100) and RAC (101) of the conversion kit (111) are attached to the front and center (below the seat) of the frame respectively, using the open attachment points. In an embodiment, the rear triangle for retaining the wheel is removed from the frame.

In an embodiment, the front wheel of a bicycle is removed (not shown), creating free ends of the front fork (181) where the extension arms (103) of the FAC (100) is attached. In a particular embodiment, the extension arms (103) of the FAC (100) slide over the free-ended front fork pipes (181) such that the front fork pipes slip into the extension arms (103) like a sleeve. In an embodiment, the rear wheel of a bicycle and its attached frame is removed (not shown), creating a vacant central rod (184). The RAC (101) is attached to the central rod (184) using the mount unit (124). In an embodiment, the frame shape is altered by creating a custom frame or by using a pre-existing cycling frame, according to the desired activity. In an embodiment, two skis (185) are attached to the ski attachment unit (123) via a snap in mechanism and is ready to ride the hybrid vehicle (180). The hybrid bike works such that when one ski moves up the other ski moves down because of the structural interdependence provided by the C Channels in the pivot unit (121). The support bars (131) and therefore the attached skis (185) move in generally opposite ways and are not free to move independently thus significantly reducing instability for the rider during motion.

In an embodiment of the invention, FIGS. 9a, 9b and 9c illustrate the conversion kit (111) in use with a frame (182) that has a steering bar (183) to transform a bicycle into a cross-country hybrid snow vehicle (190). In this embodiment, the rear wheel and pedals (192) of the bicycle are not removed, enabling a user to ride the hybrid vehicle (190) along a long distance or cross country on various surfaces including flat or up hill surfaces, using the pedaling forces to push the vehicle along. In an embodiment, the frame (182) has an open attachment point (194) that is created by removing the front wheel of the bicycle. In an embodiment, open attachment points are the two ends of the fork (194) that remain exposed after the front wheel has been removed. With further reference to FIG. 2, the FAC (100) of the conversion kit (111) is attached to these open attachment points by the extension arms (103) sliding over the forks like a sleeve and are secured using a second coupler (109) and bolts (110). In an embodiment the upper end of the FAC (108) is also drilled and attached to the bicycle forks (194) with screws for secure connection.

In an embodiment the RAC (101) is attached to the central rod (184) of the frame (182) using the mount unit (124). In an embodiment, the tire of the wheel (193) and rear skis (185) are in contact with the ground, allowing the rider to sit on the seat (187) or stand while or in between pedaling. In one embodiment, the rear wheel extends partially below the level of the skis to ensure traction. The rear skis (185) provide additional balance and support for the vehicle (190) when it is in motion. In an embodiment, the width of the pivot unit (121) is reduced, for example to 5", in order to allow for the support pipes (131) to operate freely between the bicycle pedals.

Figure 10:
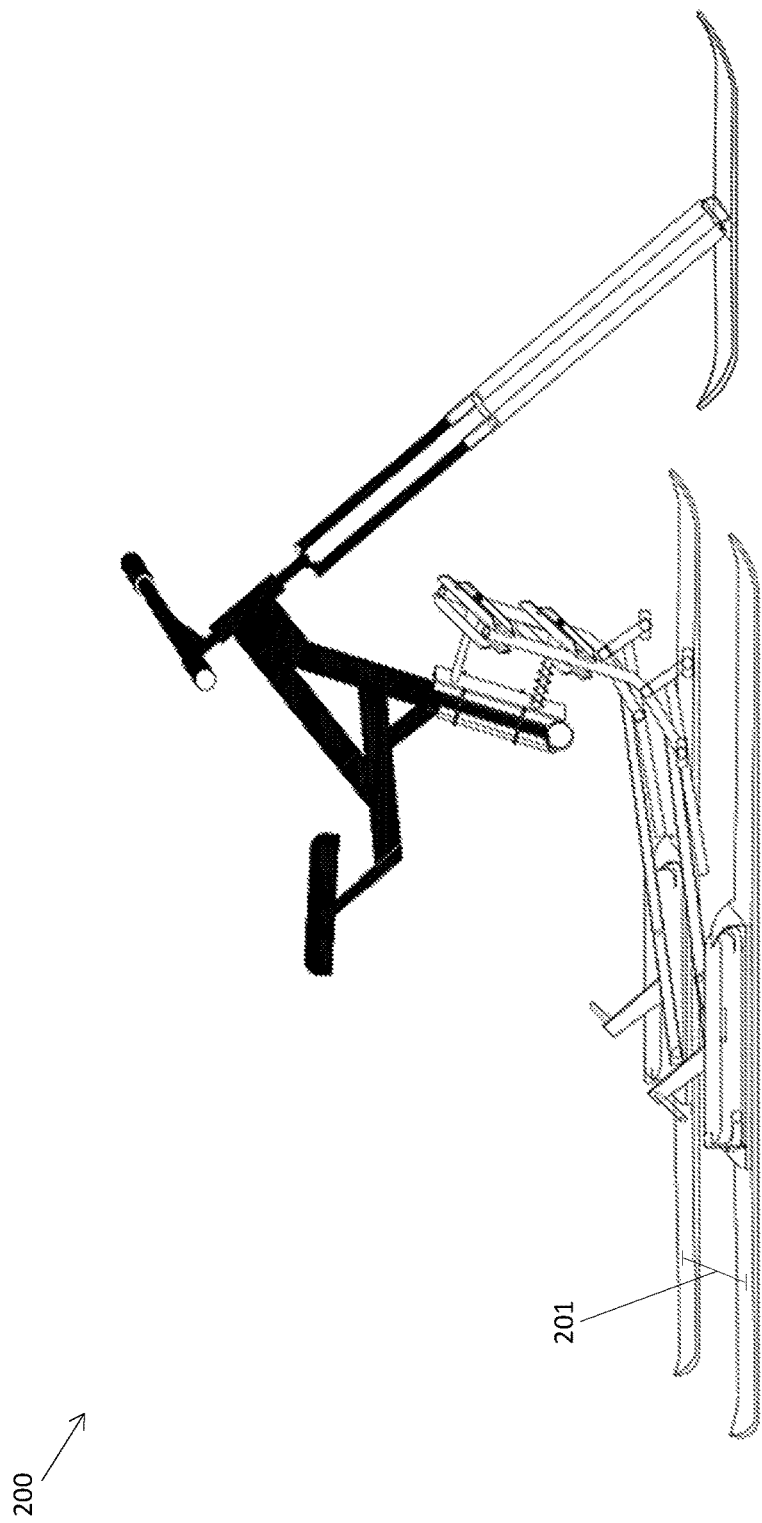
FIG. 10 is a right side elevation view of the conversion kit in use as an easy-rider downhill hybrid snow vehicle, according to an embodiment of the present invention.

In an embodiment of the invention, FIG. 10 illustrates the conversion kit (111) in use to transform a dual suspension bicycle frame (182) into an easy riding down hill snow vehicle (200), where, with reference to FIG. 4 the foot levers (161) are located at a moderately wide distance, and outwardly disposed, due to an increased width of the pivot unit (121). The wider width of the pivot unit (121) translates into a greater distance between the skis (201) providing better stability.

Figure 11:
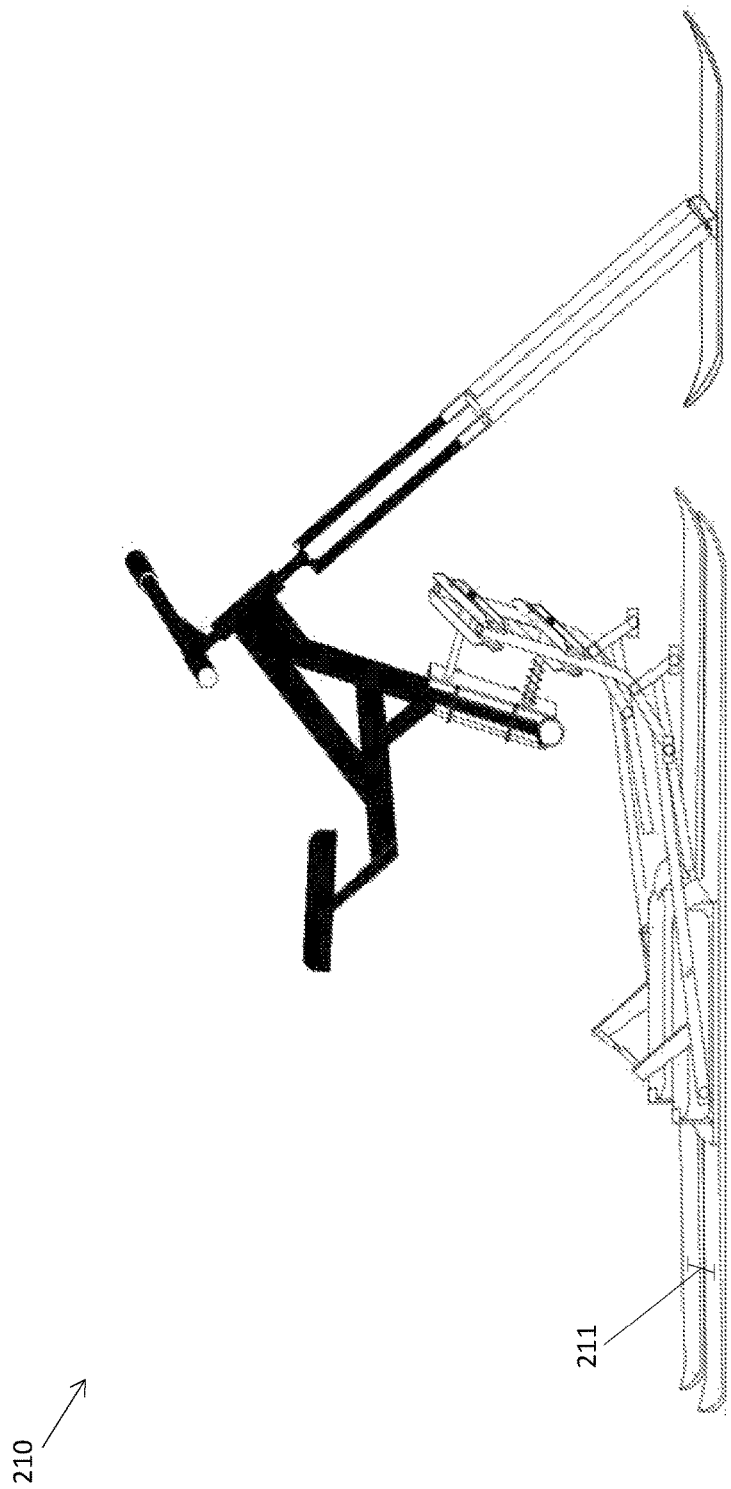
FIG. 11 is a right side elevation view of the conversion kit in use as a downhill racer hybrid snow vehicle, according to an embodiment of the present invention.

In an embodiment of the invention, FIG. 11 illustrates the conversion kit in use to transform a dual suspension bicycle frame into a down hill racer snow vehicle (210), where the distance (211) between the parallel skis (shown in FIG. 6) is reduced by having rear skis between support pipes instead of outside. The reduced distance (211) allows the vehicle and rider to travel faster similar to conventional skiing techniques.

Figure 12:
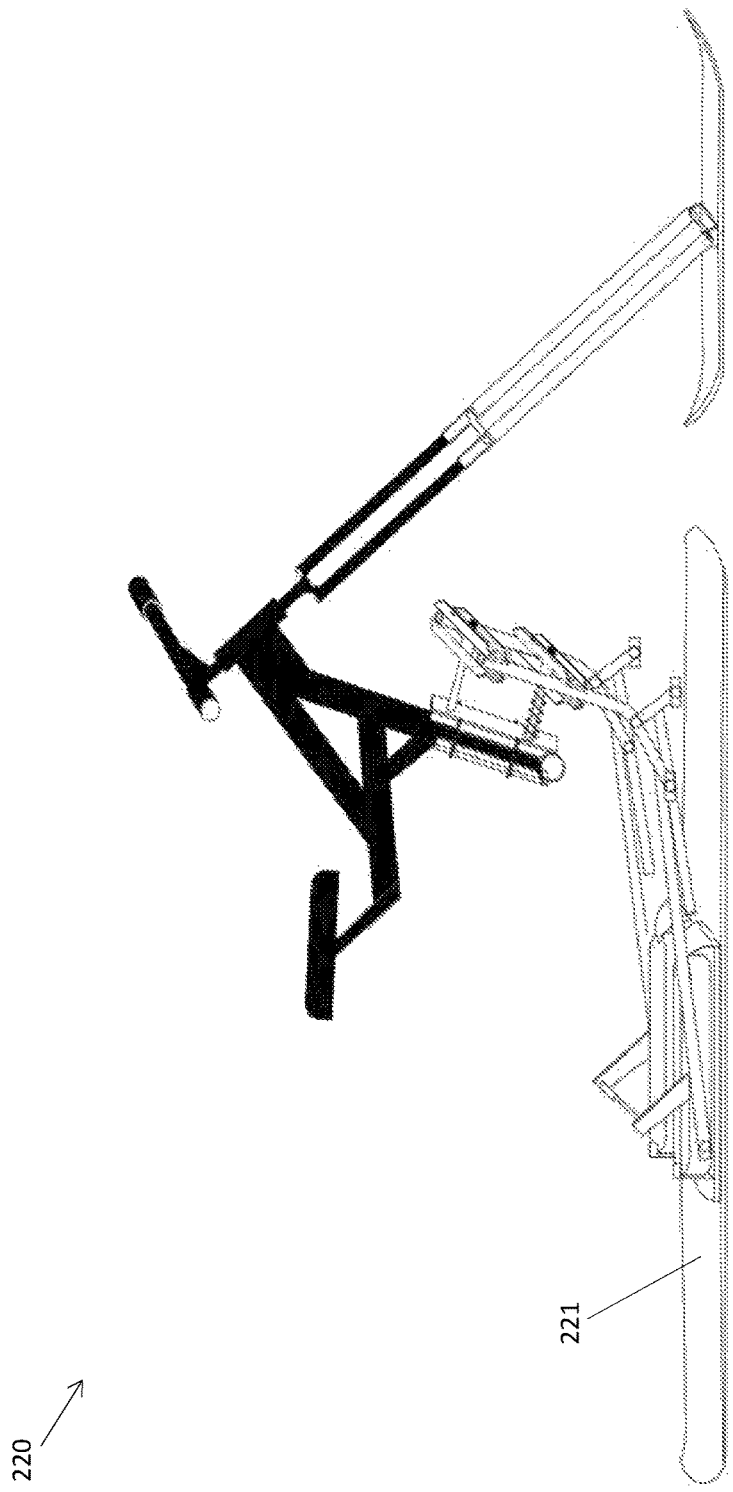
FIG. 12 is a right side elevation view of the conversion kit in use as a snowboard-rider hybrid snow vehicle, according to an embodiment of the present invention.

In an embodiment of the invention, FIG. 12 illustrates the conversion kit in use to transform a dual suspension bicycle frame into a hybrid vehicle (220) using a snowboard (221) as the rear attachment. In a particular embodiment, both ski attachment molds (160) are connected to a single snowboard (221) such that the pivot unit (121) cannot move and thus transforming the hybrid vehicle from a three-ski snow bike (200 and 210) into a two-ski snow bike (220).

In an embodiment, the conversion kit (111) is preassembled and attached to the frame (182) prior to taking the hybrid bike out onto a desired terrain. In particular embodiments, the attachment mechanisms allow for the hybrid vehicle to be transformed in a short period of time and with ease allowing a rider to change between possible embodiments to suit the desired activity, for example but not limited to changing from a cross country hybrid (190) to a down hill racer (180).

The inventor shows the hybrid vehicles (180, 190, 200, 210, 220, 221) for illustrative purposes only to demonstrate some of the embodiments of the present invention. The conversion kit (111) can be altered and manipulated in several ways not limited by the examples in this disclosure to accommodate specific frames, riders and activities.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A conversion kit for a snow vehicle comprising:
   a. a front assembly component configured to be releasably attached to a front section of a frame, the front assembly component comprising:

- i. a front ski;
- ii. a bracket attached to the front ski;
- iii. one or more extension arms pivotally attached to the bracket and extending upwardly from the front ski, the arms configured to engage with the front section of the frame; and
- b. a rear assembly component configured to be releasably attached to a central section of the frame, the rear assembly component comprising:
  - i. two adjacent members;
  - ii. a pivot unit, comprising two horizontal pivot bars pivotally connecting the two adjacent members at its ends;
  - iii. a mount pivotally connected to a midpoint of the pivot unit, comprising a clamping attachment on one end configured to retain a section of the frame on another end, the mount further comprising at least one coil spring provided between the clamping attachment and the pivot unit configured to provide suspension;
  - iv. a ski attachment terminating each adjacent member;
  - v. two brake pedals; and
  - vi. two footrests;
  - wherein the two horizontal pivot bars move the two adjacent members interdependently, and wherein each adjacent member extends from the pivot unit and terminates at the ski attachment.

2. The conversion kit of claim 1, wherein the pivot unit has a varying width.

3. The conversion kit of claim 1, wherein the ski attachment comprises a mold configured to be received by a snap in type ski binding.

4. The conversion kit of claim 1, wherein the frame is a bicycle frame with dual suspension.

5. The conversion kit of claim 1, wherein the braking unit is pivotally connected to the adjacent member, and further comprises two brake bars, each of the two brake bars being in communication with one of the two brake pedals, and that is configured to extend downwardly when pressure is applied to the pedal.

6. The conversion kit of claim 1, wherein the ski attachments further comprise upwardly disposed levers configured to lift the front ski from the ground when stepped upon by a rider.

7. The conversion kit of claim 1, wherein each of the pivot bars is comprised of a pair of C-channels having a width of approximately 5 inches.

\* \* \* \* \*